(12) United States Patent
Kamiya (10) Patent No.: US 12,387,875 B2
(45) Date of Patent: Aug. 12, 2025

(54) FERRITE SINTERED MAGNET AND METHOD FOR MANUFACTURING FERRITE SINTERED MAGNET

(71) Applicant: TDK Corporation, Tokyo (JP)

(72) Inventor: Keisuke Kamiya, Tokyo (JP)

(73) Assignee: TDK Corporation, Tokyo (JP)

( * ) Notice: Subject to any disclaimer, the term of this patent is extended or adjusted under 35 U.S.C. 154(b) by 620 days.

(21) Appl. No.: 17/689,274

(22) Filed: Mar. 8, 2022

(65) Prior Publication Data

US 2022/0293338 A1  Sep. 15, 2022

(30) Foreign Application Priority Data

Mar. 9, 2021 (JP) .................................. 2021-037265

(51) Int. Cl.
| | |
|---|---|
| H01F 41/02 | (2006.01) |
| C04B 35/26 | (2006.01) |
| C04B 35/626 | (2006.01) |
| C04B 35/64 | (2006.01) |
| H01F 1/11 | (2006.01) |

(52) U.S. Cl.
CPC ..... *H01F 41/0266* (2013.01); *C04B 35/2633* (2013.01); *C04B 35/2641* (2013.01); *C04B 35/6262* (2013.01); *C04B 35/64* (2013.01); *H01F 1/11* (2013.01); *C04B 2235/3274* (2013.01); *C04B 2235/3454* (2013.01); *C04B 2235/767* (2013.01)

(58) Field of Classification Search
None
See application file for complete search history.

(56) References Cited

U.S. PATENT DOCUMENTS

2013/0285779 A1\* 10/2013 Kobayashi .......... C04B 35/6262
264/611
2019/0122792 A1   4/2019 Nagaoka et al.

FOREIGN PATENT DOCUMENTS

| JP | 2005-045167 A | 2/2005 |
|---|---|---|
| JP | 4591684 B2 | 12/2010 |
| JP | 6769482 B2 | 10/2020 |

\* cited by examiner

*Primary Examiner* — Xiaowei Su
(74) *Attorney, Agent, or Firm* — Faegre Drinker Biddle & Reath LLP (57) ABSTRACT

A ferrite magnet includes: a hexagonal ferrite main phase; and a second phase. The second phase is an oxide phase containing: an element A which is at least one selected from the group consisting of Ca, Sr, Ba, Bi, and rare earth elements; a transition metal element T including at least Fe; and an element G which is at least one selected from the group consisting of Si, Al, B, F, K, Na, Li, P, and S. When the total number of atoms of the element A, the transition metal element T, and the element G in the second phase is set to 100 at %, the element A occupies 30 to 80 at %, the element G occupies 15 to 40 at %, and the transition metal element T occupies less than 4 at %.

4 Claims, 1 Drawing Sheet

FERRITE SINTERED MAGNET AND METHOD FOR MANUFACTURING FERRITE SINTERED MAGNET

TECHNICAL FIELD

The present disclosure relates to a ferrite sintered magnet and a method for manufacturing the same.

BACKGROUND

Various hexagonal ferrites such as magnetoplumbite type (M-type) ferrites are known as magnetic materials used in ferrite sintered magnets (for example, refer to Patent Documents 1 to 3).

PATENT DOCUMENTS

[Patent Document 1] Japanese Patent No. 4591684
[Patent Document 2] Japanese Unexamined Patent Publication No. 2005-45167
[Patent Document 3] Japanese Patent No. 6769482

SUMMARY

In hexagonal ferrite sintered magnets in the related art, attempts have been made to increase both residual magnetic flux density Br and coercive force HcJ by adding an oxide of Si or the like.

However, it has been difficult to sufficiently improve such characteristics in a ferrite sintered magnet containing La, for example.

The present invention has been made in consideration of the above-described problem, and an object of the present invention is to provide a novel ferrite sintered magnet capable of increasing both residual magnetic flux density and coercive force, and a method for manufacturing the same.

A sintered magnet according to one aspect of the present invention is a ferrite sintered magnet including: a hexagonal ferrite main phase and a second phase, in which the second phase is an oxide phase containing an element A which is at least one selected from the group consisting of Ca, Sr, Ba, Bi, and rare earth elements; a transition metal element T including at least Fe; and an element G which is at least one selected from the group consisting of Si, Al, B, F, K, Na, Li, P, and S, and when the total number of atoms of the element A, the transition metal element T, and the element G in the second phase is set to 100 at %, the element A accounts for 30 to 80 at %, the element G accounts for 15 to 40 at %, and the transition metal element T accounts for less than 4 at %.

Here, the above-described sintered magnet may contain 0.05 to 10 mass % of the second phase.

In addition, the second phase may contain an apatite compound having a $La_{4.67}[SiO_4]_3O$ phase as a prototype.

The hexagonal ferrite may be a magnetoplumbite-type ferrite.

A method for manufacturing a sintered magnet according to one aspect of the present invention includes: calcining a raw material powder to obtain a calcined body; pulverizing the calcined body to obtain a hexagonal ferrite powder; adding an additional powder to the ferrite powder to obtain a mixed powder; molding the mixed powder to obtain a molded body; and firing the molded body, in which the additional powder contains an element A which is at least one selected from the group consisting of Ca, Sr, Ba, Bi, and rare earth elements, and an element G which is at least one selected from the group consisting of Si, Al, B, F, K, Na, Li, P, and S, and the additional powder may contains a transition metal element T, and when the total number of atoms of the element A, the transition metal element T, and the element G in the additional powder is set to 100 at %, the element A accounts for 30 to 80 at %, the element G accounts for 15 to 40 at %, and the transition metal element T accounts for less than 4 at %.

In the above-described method, the amount of the additional powder added may be set to be greater than 0.05 mass % and less than or equal to 8.0 mass %.

In the above-described method, the additional powder may contain an apatite compound having a $La_{4.67}[SiO_4]_3O$ phase as a prototype.

In the above-described method, the hexagonal ferrite may be a magnetoplumbite-type ferrite.

According to the present invention, a ferrite sintered magnet capable of increasing both residual magnetic flux density and coercive force, and a method for manufacturing the same are provided.

DETAILED DESCRIPTION

Hereinafter, some embodiments of the present invention will be described in detail.
(Sintered Magnet)

Figure 1:
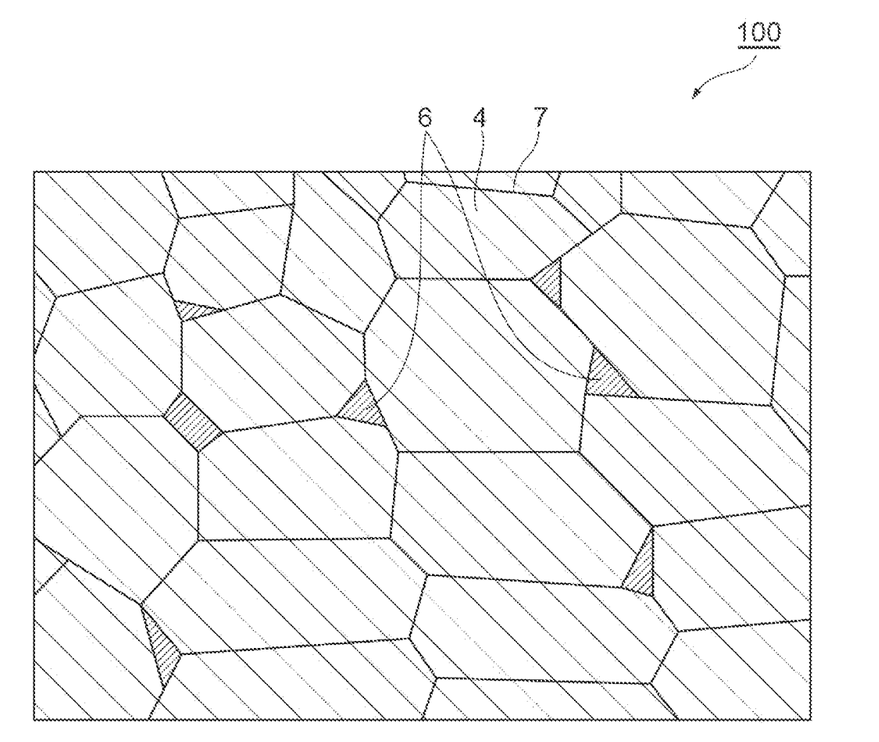
FIG. 1 is a cross-sectional schematic diagram of a ferrite sintered magnet.

FIG. 1 is a cross-sectional schematic diagram of a ferrite sintered magnet 100 according to an embodiment of the present invention. The ferrite sintered magnet 100 according to the embodiment of the present invention includes hexagonal ferrite main phases (crystal grains) 4 and second phases 6 present between the hexagonal ferrite main phases (crystal grains) 4. Grain boundary phases 7 can be further present between the hexagonal ferrite main phases 4.
(Hexagonal Ferrite Main Phase)

A hexagonal ferrite is a ferrite having a hexagonal crystal structure. Examples of such ferrites include a magnetoplumbite type (M-type) ferrite, a W-type ferrite, an X-type ferrite, an Y-type ferrite, and a Z-type ferrite. Among them, a hexagonal ferrite is preferably an M-type ferrite.

A hexagonal ferrite is an oxide containing: at least one element A1 selected from the group consisting of Ca, Sr, and Ba; at least one element A2 selected from the group consisting of rare earth elements and Bi; and a transition metal element T including at least Fe.

Examples of rare earth elements include yttrium (Y), scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

Examples of transition metal elements T other than Fe include Co, Zn, Ti, V, Cr, Mn, Ni, and Cu.

The element A1 preferably includes at least Ca, and in a case where Ca is included, the element A1 may further include Sr and/or Ba.

The element A2 preferably includes at least La.

The element T preferably includes Co in addition to Fe.

In a hexagonal ferrite main phase, when the total number of atoms of the element A1 and element A2 is set to 1, the number of atoms of the element T can be set to 8 to 13 and is preferably set to 10 to 13.

When the total number of atoms of the element T is set to 100 at %, the atomic proportion of Fe can be set to 90 to 100 at % and is preferably set to 96 to 100 at %. In addition, the atomic proportion of Co is preferably 0 to 5 at %.

In a hexagonal ferrite main phase, the proportion of the number of atoms of the element A2 when the total number of atoms of the element A1 and element A2 is set to 1 can be set to 0.1 to 1.0 and is preferably set to 0.4 to 1.0.

In a hexagonal ferrite main phase, the proportion of the number of atoms of La when the total number of atoms of the element A1 and element A2 is set to 1 is suitably greater than or equal to 0.4.

In a hexagonal ferrite main phase, the proportion of the number of atoms of Ca when the total number of atoms of the element A1 is set to 1 is suitably greater than or equal to 0.1.

The M-type ferrite can be represented by Formula (III) below.

$$MX_{12}O_{19} \qquad (III)$$

Some of the elements A1 and the elements A2 can enter the site M. Some of the elements T and the elements A2 can enter the site X.

In reality, since the proportion of M (site A) and X (site B) or the proportion of the oxygen (O) of Formula (III) above shows a value slightly deviated from the above-described range, the proportion may be deviated from the above-described numerical values by about 10%.

In the present specification, a "main phase" refers to a crystal phase having the largest mass proportion in a ferrite sintered magnet.

The content of hexagonal ferrite main phases in an entire sintered magnet may be greater than or equal to 70 mass %, greater than or equal to 80 mass %, greater than or equal to 90 mass %, or greater than or equal to 95 mass %. The mass proportion of a hexagonal ferrite main phase can be obtained through X-ray diffraction measurement or the like.

The average particle diameter of hexagonal ferrite main phases (crystal grains) of a ferrite sintered magnet may be, for example, less than or equal to 5 μm, less than or equal to 4.0 μm, or 0.5 to 3.0 μm. When hexagonal ferrite main phases have such an average particle diameter, the coercive force can be further increased. The average particle diameter of ferrite main phases (crystal grains) can be obtained using an observation image of a cross section using TEM or SEM. Specifically, after the cross section of several hundreds of hexagonal ferrite main phases (crystal grains) in a cross section of SEM or TEM including the ferrite main phases is obtained through image analysis, the diameter (circle-equivalent diameter) of a circle having the cross-sectional area is defined as a particle diameter of the main phase particles on the cross section to measure a particle size distribution. From the measured number-based particle size distribution, a number-based average value of the particle diameters of the hexagonal ferrite main phases (crystal grains) is calculated. The average value measured in this manner is taken as an average particle diameter of the hexagonal ferrite main phases.

(Second Phase)

A second phase 6 is an oxide phase containing: an element A which is at least one selected from the group consisting of Ca, Sr, Ba, Bi, and rare earth elements (including Y); a transition metal element T including at least Fe; and an element G which is at least one selected from the group consisting of Si, Al, B, F, K, Na, Li, P, and S.

When the total number of atoms of the element A, the transition metal element T, and the element G is set to 100 at %, the element A occupies 30 to 80 at %, the element G occupies 15 to 40 at %, and the transition metal element T occupies less than 4 at % in the second phase. When the total number of atoms of the element A, the transition metal element T, and the element G is set to 100 at %, the total number of atoms of the element A and the element G in the second phase can be set to be greater than or equal to 80 at %, greater than or equal to 90 at %, and greater than or equal to 95 at %.

In another example, a second phase 6 is an oxide phase containing: an element A which is at least one selected from the group consisting of Ca, Sr, Ba, Bi, and rare earth elements (including Y); a transition metal element T including at least Fe; and Si.

In this case, when the total number of atoms of all the metal elements and all the metalloid element is set to 100 at %, the element A can occupy 30 to 80 at %, Si can occupy 10 to 40 at % (or may occupy greater than or equal to 15 at %), and the transition metal element T can occupy less than 4 at % in the second phase. When the total number of atoms of all the metal elements and all the metalloid element is set to 100 at %, the total number of atoms of the element A and Si in the second phase can be set to be greater than or equal to 80 at %, greater than or equal to 90 at %, and greater than or equal to 95 at %.

The element A can include both at least one selected from the group consisting of Ca, Sr, and Ba and at least one selected from the group consisting of Bi and rare earth elements. The element A can include both La and at least one selected from the group consisting of Ca, Sr, and Ba. The element A can include Ca and La.

When the total number of atoms of all the metal elements and all the metalloid elements is set to 100 at % or when the total number of atoms of the element A, the transition metal element T, and the element G is set to 100 at %, the total proportion of at least one element selected from the group consisting of Ca, Sr, and Ba in the second phase can be set to 0 to 80 at %, and in particular, the proportion of Ca can be set to 5 to 50 at %.

When the total number of atoms of all the metal elements and all the metalloid elements is set to 100 at % or when the total number of atoms of the element A, the transition metal element T, and the element G is set to 100 at %, the total proportion of at least one element selected from the group consisting of Bi and rare earth elements in the second phase can be set to 30 to 80 at %, and in particular, the proportion of La can be set to 10 to 65 at %.

When the total number of atoms of the element A, the transition metal element T, and the element G is set to 100 at %, the atomic proportion of the element G in the second phase is 15 to 40 at %, and preferably 18 to 40 at % or 20 to 40 at %. In this case, when the total number of atoms of the element A, the transition metal element T, and the element G is set to 100 at %, the atomic proportion of Si in the second phase may be greater than or equal to 5 at %, greater than or equal to 10 at %, greater than or equal to 15 at %, greater than or equal to 18 at %, greater than or equal to 20 at %, greater than or equal to 25 at %, or greater than or equal to 30 at %.

When the total number of atoms of all the metal elements and all the metalloid elements is set to 100 at %, the atomic proportion of Si in the second phase may be 10 to 40 at % or 15 to 40 at %, and preferably 18 to 40 at % or 20 to 40 at %.

When the total number of atoms of all the metal elements and all the metalloid elements is set to 100 at % or when the total number of atoms of the element A, the transition metal element T, and the element G is set to 100 at %, the atomic proportion of Fe in the second phase can be set to be less than or equal to 4 at % or less than or equal to 3 at %.

When the total number of atoms of all the metal elements and all the metalloid elements is set to 100 at % or when the total number of atoms of the element A, the transition metal element T, and the element G is set to 100 at %, the atomic proportion of Co in the second phase can be set to be less than or equal to 4 at % and the atomic proportion of Zn can be set to be less than or equal to 4 at %.

The content of second phases in an entire sintered magnet can be 0.05 to 10 mass %.

The second phase can contain an apatite compound having a $La_{4.67}[SiO_4]_3O$ phase as a prototype. This structure is called an oxyapatite structure. In a case where the above-described structure is described as $Q_{4.67}[EO_4]_3O$, for example, Q can be an element A, E can be a transition metal element T and an element G including Si. This compound may have a $P6_3/m$ structure.

The second phase may have a compound having a Pnma structure other than a compound having the oxyapatite structure. This structure is called an orthoferrite structure.

The second phase may be a mixture of a compound having an oxyapatite structure and a compound having an orthoferrite structure.

The mass ratio of a compound having an oxyapatite structure to a compound having an orthoferrite structure in the second phase can be greater than or equal to 3, greater than or equal to 4, or greater than or equal to 5. The upper limit can be less than or equal to 40, less than or equal to 30, less than or equal to 25, or less than or equal to 20. The mass ratio can be obtained from the maximum peak ratio of each structure in XRD measurement in which CuK α-ray is used.

It can be confirmed through XRD and electron beam diffraction with TEM of the second phase that at least a part of the second phase has an oxyapatite structure. The crystal structure and the composition of the second phase can be respectively confirmed through XRD and STEM-EDX.

The shape of a ferrite sintered magnet is not particularly limited, and a ferrite sintered magnet can have various shapes, for example, a flat plate shape or an arc segment (type C) shape in which end surfaces are curved so as to have a circular arc shape.

The coercive force of a ferrite sintered magnet at 20° C. can be set to be, for example, greater than or equal to 300 kA/m. The residual magnetic flux density Br of a ferrite sintered magnet at 20° C. can be set to be greater than or equal to 400 mT. The ferrite sintered magnet of the present embodiment can have both excellent coercive force (HcJ) and residual magnetic flux density (Br).

The mass ratio of the metal and metalloid elements in the hexagonal ferrite main phases and the second phases of the ferrite sintered magnet can be measured through STEM-EDX fluorescence X-ray analysis.

(Method for Manufacturing Ferrite Sintered Magnet)

Next, an example of a method for manufacturing a ferrite sintered magnet according to an embodiment will be described. The manufacturing method described below includes a blending step, calcining step, pulverizing step, additional powder mixing step, a molding step, and a firing step. The details of each step will be described below.

(Blending Step)

The blending step is a step of preparing a raw material powder for calcining. The raw material powder for calcining contains constituent elements of a hexagonal ferrite main phase. That is, the raw material powder for calcining contains an element A1, an element A2, and an element T. In the blending step, it is preferable to obtain the raw material powder by mixing a mixture of powders containing each element with an attritor, a ball mill, or the like for about 1 to 20 hours and pulverizing the mixture to obtain the raw material powder.

Examples of powders containing each element include a simple substance of each element, an oxide, a hydroxide, a carbonate, a nitrate, a silicate, and an organic metal compound. One powder may contain two or more metal elements, or one powder may contain substantially only one metal element.

An example of a powder containing Ca is $CaCO_3$. An example of a powder containing Sr is $SrCO_3$. An example of a powder containing Ba is $BaCO_3$. Examples of powders containing La are $La_2O_3$ and $La(OH)_3$. An example of a powder containing Fe is $Fe_2O_3$. An example of a powder containing Co is $Co_3CO_4$.

The proportion of each metal element in the raw material powder can be appropriately set according to the composition of the above-described hexagonal ferrite main phase.

The average particle diameter of the raw material powder is not particularly limited, and is, for example, 0.1 to 5.0 μm.

After the blending step, it is preferable to dry the raw material powder and remove coarse particles using a sieve, as necessary.

(Calcining Step)

In the calcining step, the raw material powder obtained in the blending step is calcined to obtain a calcined body. The calcination is preferably performed, for example, in an oxidizing atmosphere such as air. The calcination temperature may be, for example, 1100° C. to 1400° C. or may be 1100° C. to 1350° C. The calcination time may be, for example, 1 minute to 10 hours or may be 1 minute to 3 hours. The proportion of hexagonal ferrite main phases in the calcined body obtained through the calcination may be, for example, greater than or equal to 70 mass % or may be greater than or equal to 75 mass %. This proportion of hexagonal ferrite main phases can be obtained in the same manner as that of hexagonal ferrite main phases in the ferrite sintered magnet.

(Pulverizing Step)

In the pulverizing step, the calcined body which has become granular or lumpy through the calcining step is pulverized to obtain a ferrite powder. The pulverizing step may be divided into, for example, two steps: the calcined powder is pulverized into a coarse powder (coarse pulverization step), and is then further finely pulverized (fine pulverization step).

The coarse pulverization can be performed using a vibration mill or the like until the average particle diameter of the calcined bodies is 0.1 to 10.0 μm.

In the fine pulverization, the coarse powder obtained through the coarse pulverization is further pulverized using a wet attritor, ball mill, a jet mill, or the like. In the fine pulverization, pulverization can be performed so that the average particle diameter of the obtained particles is, for example, about 0.08 to 5.0 μm. The specific surface area of a fine powder (for example, obtained through a BET method) is, for example, about 7 to 12 $m^2/g$. The suitable pulverization time varies depending on the pulverization method. For example, the suitable pulverization time is 30 minutes to 10 hours in a case of a wet attritor and 10 to 50 hours in wet pulverization using a ball mill. The specific surface area of the obtained powder can be measured using a commercially available BET specific surface area measurement device (manufactured by Mountech, Co., Ltd., trade name of HM Model-1210).

In the fine pulverization step, polyhydric alcohols represented by a general formula $C_n(OH)_nH_{n+2}$ may be added to enhance the degree of magnetic orientation of a sintered body obtained after firing. n in the general formula may be, for example, 4 to 100 or 4 to 30. Examples of polyhydric alcohols include sorbitol. In addition, two or more polyhydric alcohols may be used in combination. Furthermore, other well-known dispersants may be used in combination in addition to the polyhydric alcohols.

In a case where polyhydric alcohols are added, the amount of polyhydric alcohols added may be, for example, 0.05 to 5.0 mass % or 0.1 to 3.0 mass % with respect to objects to be added (for example, a coarse powder). The polyhydric alcohols added in the fine pulverization step are thermally decomposed in a firing step to be described below and removed.

(Additional Powder Addition Step)

Subsequently, the ferrite powder is mixed with an additional powder to obtain a mixed powder.

The additional powder may be mixed with the pulverized ferrite powder obtained in the pulverization step. However, it is preferable to add the additional powder to the powder in the pulverization step to simultaneously perform pulverization of the calcined body and the additional powder and mixing the ferrite powder with the additional powder.

The additional powder contains at least an element A which is at least one selected from the group consisting of Ca, Sr, Ba, Bi; and rare earth elements (including Y); and an element G which is at least one selected from the group consisting of Si, Al, B, F, K, Na, Li, P, and S. The additional powder may contain a transition metal element T. When the total number of atoms of the element A, the transition metal element T, and the element G in the additional powder is set to 100 at %, the element A occupies 30 to 80 at %, the element G occupies 15 to 40 at %, and the transition metal element T occupies less than 4 at %. When the total number of atoms of the element A, the transition metal element T, and the element G is set to 100 at %, the total number of atoms of the element A and the element G in the additional powder can be set to be greater than or equal to 80 at %, greater than or equal to 90 at %, and greater than or equal to 95 at %.

In another example, the additional powder contains at least an element A which is at least one selected from the group consisting of Ca, Sr, Ba, Bi, and rare earth elements (including Y); and Si. The additional powder may contain a transition metal element T. When the total number of atoms of the metal elements and the metalloid element in the additional powder is set to 100 at %, the element A occupies 30 to 80 at %, Si occupies 10 to 40 at % (or may occupy greater than or equal to 15 at %), and the transition metal element T occupies less than 4 at %. When the total number of atoms of all the metal elements and all the metalloid element is set to 100 at %, the total number of atoms of the element A and Si in the additional powder can be set to be greater than or equal to 80 at %, greater than or equal to 90 at %, and greater than or equal to 95 at %.

The element A can include both at least one selected from the group consisting of Ca, Sr, and Ba and at least one selected from the group consisting of Bi and rare earth elements. The element A can include both La and at least one selected from the group consisting of Ca, Sr, and Ba. The element A can include Ca and La.

When the total number of atoms of all the metal elements all the metalloid elements is set to 100 at % or when the total number of atoms of the element A, the transition metal element T, and the element G is set to 100 at %, the total proportion of at least one element selected from the group consisting of Ca, Sr, and Ba in the above-described additional powder can be set to 0 to 80 at %, and in particular, the proportion of Ca can be set to 5 to 50 at %.

When the total number of atoms of all the metal elements and all the metalloid elements is set to 100 at % or when the total number of atoms of the element A, the transition metal element T, and the element G is set to 100 at %, the total proportion of at least one element selected from the group consisting of Bi and rare earth elements in the above-described additional powder can be set to 30 to 80 at %, and in particular, the proportion of La can be set to 10 to 65 at %.

When the total number of atoms of the element A, the transition metal element T, and the element G is set to 100 at %, the atomic proportion of the element G in the above-described additional powder is 15 to 40 at %, and preferably 18 to 40 at % or 20 to 40 at %. In this case, when the total number of atoms of the element A, the transition metal element T, and the element G is set to 100 at %, the atomic proportion of Si in the above-described additional powder may be greater than or equal to 5 at %, greater than or equal to 10 at %, greater than or equal to 15 at %, greater than or equal to 18 at %, greater than or equal to 20 at %, greater than or equal to 25 at %, or greater than or equal to 30 at %.

When the total number of atoms of all the metal elements and all the metalloid elements is set to 100 at %, the atomic proportion of Si in the above-described additional powder may be 10 to 40 at % or 15 to 40 at %, and preferably 18 to 40 at % or 20 to 40 at %.

When the total number of atoms of all the metal elements and all the metalloid elements is set to 100 at % or when the total number of atoms of the element A, the transition metal element T, and the element G is set to 100 at %, the atomic concentration of Fe in the above-described additional powder is preferably set to be less than or equal to 4 at % or less than or equal to 3 at %.

When the total number of atoms of all the metal elements and all the metalloid elements is set to 100 at % or when the total number of atoms of the element A, the transition metal element T, and the element G is set to 100 at %, the atomic proportion of Co in the above-described additional powder can be set to 0 to 4 at % and the atomic proportion of Zn can be set to 0 to 4 at %.

The additional powder may be an oxide or a salt such as a carbonate. The additional powder may be a mixture of various compounds, for example, a mixture of oxides, a mixture of salts, or a mixture of a salt and an oxide.

An example of an oxide is an oxyapatite compound having a $La_{4.67}[SiO_4]_3O$ phase as a prototype. An example of such oxyapatite is $La_8Ca_2[SiO_2]_6O_2$. In addition, the additional powder may be a compound having an orthoferrite structure or may be a mixture thereof.

An example of a salt is $CaCO_3$.

The additional powder can contain greater than or equal to 50 mass % of a compound with an oxyapatite structure, greater than or equal to 70 mass % thereof or greater than or equal to 90 mass % thereof.

It is preferable that the amount of additional powder with respect to 100 parts by mass of a ferrite powder be greater than or equal to 0.05 mass % and less than 8.0 mass %.

In a case where pulverization of a calcined body is performed in two steps, an additional powder may be added either before or after the coarse pulverization step, or may be added two times before and after the coarse pulverization.

(Molding Step)

In the molding step, the mixed powder obtained in the additional powder mixing step (for example, the pulverization step) is molded in a magnetic field to obtain a molded body. The molding can be performed through either dry molding or wet molding. From the viewpoint of enhancing the degree of magnetic orientation, wet molding is preferably performed.

In a case where molding is performed through wet molding, after a slurry is obtained by performing the above-described fine pulverization step in a wet manner, this slurry is concentrated to a predetermined concentration to obtain a slurry for wet molding, for example. Molding can be performed using this slurry for wet molding. The slurry can be concentrated through centrifugal separation, filter press, or the like. The content of ferrite particles in the slurry for wet molding is, for example, 30 to 80 mass %. Examples of dispersion media for dispersing ferrite in the slurry particles include water. Surfactants such as gluconic acid, gluconate, and sorbitol may be added to the slurry. A non-aqueous solvent may be used as a dispersion medium. An organic solvent such as toluene or xylene can be used as a non-aqueous solvent. In this case, a surfactant such as oleic acid may be added. The slurry for wet molding may be prepared by adding a dispersion medium or the like to dried ferrite particles after fine pulverization.

In the wet molding, this slurry for wet molding is then molded in a magnetic field. In this case, the molding pressure is, for example, 9.8 to 196 MPa (0.1 to 2.0 ton/cm$^2$). The magnetic field to be applied is, for example, 398 to 1194 kA/m (5 to 15 kOe).

(Firing Step)

In the firing (main firing) step, the molded body obtained in the molding step is fired to obtain a ferrite sintered magnet. The firing of a molded body can be performed in an oxidizing atmosphere such as atmospheric air. The firing temperature may be, for example, 1050° C. to 1300° C. or may be 1080° C. to 1290° C. In addition, the firing time (time for holding the firing temperature) is, for example, 0.5 to 3 hours.

In the firing step, heating may be performed, for example, at a rate of temperature increase of about 0.5° C./minute from room temperature to about 100° C. before the temperature reaches a sintering temperature. Accordingly, the molded body can be sufficiently dried before sintering proceeds. In addition, the surfactant added in the molding step can be sufficiently removed. Such treatment may be performed at the beginning of the firing step or may be performed separately before the firing step.

In this manner, the above-described ferrite sintered magnet can be manufactured.

In addition, the molding step and the firing step may be performed according to the following procedure, for example. That is, the molding step may be performed through a ceramic injection molding (CIM) method or powder injection molding (PIM, a type of powder injection molding). In the CIM method, a dried mixed powder is heated and kneaded together with a binder resin to form a pallet. This pallet is injection-molded in a mold to which a magnetic field is applied to obtain a preliminary molded body. This preliminary molded body is debindered to obtain a molded body. Next, in the firing step, the debindered molded body can be sintered, for example, in atmospheric air at a temperature of preferably 1100° C. to 1300° C., more preferably 1160° C. to 1290° C. for about 0.2 to 3 hours to obtain a ferrite sintered magnet.

EXAMPLES

The contents of the present invention will be described in more detail with reference to examples and comparative examples, but the present invention is not limited to the following examples.

Comparative Examples 1 to 4 and 6 to 8 and Examples 1 to 11 and 14 to 21

Regarding raw materials, powders of calcium carbonate (CaCO$_3$), barium carbonate (BaCO$_3$), strontium carbonate (SrCO$_3$), lanthanum hydroxide (La(OH)$_3$), iron oxide (Fe$_2$O$_3$), and cobalt oxide (Co$_3$O$_4$) were prepared.

These raw material powders were blended so that the metal atomic ratio had the same metal composition as the M-type ferrite main phase composition in Table 1. Mixing and pulverizing were performed using a wet attritor and a ball mill to obtain a slurry (blending step). After drying this slurry and removing coarse particles, calcining was performed in atmospheric air at 1280° C. to obtain a calcined powder (calcination step).

TABLE 1

| | M-type ferrite main phase composition | | | | | | Additional powder | | |
|---|---|---|---|---|---|---|---|---|---|
| | | A | | | T | | | | Addition |
| | A2 | A1 | | | | | | Composition | amount |
| | La | Ca | Sr | Ba | Fe | Co | Type | (molar ratio) | Wt % |
| Comparative Example 1 | 0.55 | 0.45 | 0 | 0 | 10.1 | 0.3 | — | — | 0 |
| Example 1 | | | | | | | Oxyapatite #1 | — | 5 |
| Example 2 | | | | | | | Oxyapatite #2 | — | 5 |
| Comparative Example 2 | | | | | | | Oxyapatite #3 | — | 5 |
| Comparative Example 3 | | | | | | | Oxyapatite #4 | — | 5 |
| Comparative Example 4 | | | | | | | Oxyapatite #5 | — | 5 |
| Comparative Example 6 | | | | | | | Oxyapatite #6 | — | 5 |
| Example 3 | | | | | | | SiO$_2$ + CaCO$_3$ | 30:70 | 3 |

TABLE 1-continued

| | M-type ferrite main phase composition | | | | | | Additional powder | | |
|---|---|---|---|---|---|---|---|---|---|
| | A | | | | T | | | | Addition |
| | A2 | A1 | | | | | | Composition | amount |
| | La | Ca | Sr | Ba | Fe | Co | Type | (molar ratio) | Wt % |
| Comparative Example 7 | | | | | | | SiO$_2$ + CaCO$_3$ | 70:30 | 3 |
| Comparative Example 8 | | | | | | | SiO$_2$ + CaCO$_3$ | 70:30 | 5 |
| Example 4 | | | | | | | SiO$_2$ + CaCO$_3$ | 20:80 | 3 |
| Example 5 | | | | | | | Oxyapatite #1 | — | 0.05 |
| Example 6 | | | | | | | Oxyapatite #1 | — | 0.1 |
| Example 7 | | | | | | | Oxyapatite #1 | — | 0.5 |
| Example 8 | | | | | | | Oxyapatite #1 | — | 1 |
| Example 9 | | | | | | | Oxyapatite #1 | — | 8 |
| Example 10 | | | | | | | Oxyapatite #1 | — | 10 |
| Example 11 | | | | | | | Oxyapatite #1 | — | 12 |
| Example 12 | 0.55 | 0.4 | 0.05 | 0 | 10.1 | 0.3 | Oxyapatite #1 | — | 5 |
| Example 13 | 0.55 | 0.4 | 0 | 0.05 | 10.1 | 0.3 | Oxyapatite #1 | — | 5 |
| Example 14 | 0.55 | 0.45 | 0 | 0 | 10.1 | 0.3 | Oxyapatite #7 | — | 5 |
| Example 15 | | | | | | | Oxyapatite #8 | — | 5 |
| Example 16 | | | | | | | Oxyapatite #9 | — | 5 |
| Example 17 | | | | | | | Oxyapatite #10 | — | 5 |
| Example 18 | | | | | | | Oxyapatite #11 | — | 5 |
| Example 19 | | | | | | | Oxyapatite #12 | — | 5 |
| Example 20 | | | | | | | Oxyapatite #13 | — | 5 |
| Example 21 | | | | | | | Oxyapatite #14 | — | 5 |

The obtained calcined powder was coarsely pulverized with a small rod vibration mill to obtain a coarse powder. (Coarse Pulverization Step)

Additional powders shown in Table 1 were prepared. The composition of oxyapatite #1 to #14 is shown in Table 2.

Each oxyapatite particle was obtained by weighing raw material powders (calcium carbonate (CaCO$_3$), barium carbonate (BaCO$_3$), strontium carbonate (SrCO$_3$), lanthanum hydroxide (La(OH)$_3$), iron oxide (Fe$_2$O$_3$), cobalt oxide (Co$_3$O$_4$), zinc oxide (ZnO), and silica (SiO$_2$)) so as to have a metal composition as shown in Table 2, mixing the weighed raw material powders in an agate mortar, firing the mixture in atmospheric air, and then finely pulverizing the fired mixture with a ball mill. The firing temperature was 1200° C.

After each additional powder was added to the above-described coarse powder to achieve the composition of the additional powder with respect to the 100% by mass of the coarse powder as shown in Table 1, the mixed powder was finely pulverized using a wet ball mill to obtain a slurry containing ferrite particles (pulverization and additional powder mixing step)

TABLE 2

| | Atomic proportion of metals and metalloids | | | | | | | | | | | | | | | | | |
|---|---|---|---|---|---|---|---|---|---|---|---|---|---|---|---|---|---|---|
| | Total proportion of A | A | | | | Total proportion of T | T | | | Total proportion of G | G | | | | | | | |
| | | A1 | | | A2 | | Fe | Co | Zn | | Si | Al | B | F | K | Na | Li | P | S |
| | | Ca | Ba | Sr | La | | | | | | | | | | | | | | |
| Oxyapatite #1 | 73 | 20 | 0 | 0 | 53 | 0 | 0 | 0 | 0 | 27 | 27 | 0 | 0 | 0 | 0 | 0 | 0 | 0 | 0 |
| Oxyapatite #2 | 70 | 18 | 1 | 0 | 51 | 0 | 0 | 0 | 0 | 30 | 30 | 0 | 0 | 0 | 0 | 0 | 0 | 0 | 0 |
| Oxyapaine #3 | 51 | 16 | 0 | 0 | 35 | 3 | 2 | 1 | 0 | 46 | 46 | 0 | 0 | 0 | 0 | 0 | 0 | 0 | 0 |
| Oxyapatite #4 | 56 | 15 | 0 | 0 | 41 | 11 | 5 | 5 | 1 | 33 | 33 | 0 | 0 | 0 | 0 | 0 | 0 | 0 | 0 |

TABLE 2-continued

| | Atomic proportion of metals and metalloids | | | | | | | | | | | | | | | | | | |
|---|---|---|---|---|---|---|---|---|---|---|---|---|---|---|---|---|---|---|---|
| | Total proportion of A | A | | | | Total proportion of T | T | | | Total proportion of G | G | | | | | | | | |
| | | Ca | Ba | Sr | A1 La | A2 | | Fe | Co | Zn | | Si | Al | B | F | K | Na | Li | P | S |
| Oxyapatite #5 | 58 | 14 | 0 | 0 | 44 | 4 | 4 | 4 | 0 | 0 | 38 | 38 | 0 | 0 | 0 | 0 | 0 | 0 | 0 | 0 |
| Oxyapatite #6 | 83 | 22 | 1 | 1 | 59 | 0 | 0 | 0 | 0 | 0 | 17 | 17 | 0 | 0 | 0 | 0 | 0 | 0 | 0 | 0 |
| Oxyapatite #7 | 61 | 30 | 0 | 0 | 31 | 1 | 1 | 1 | 0 | 0 | 38 | 32 | 0 | 0 | 0 | 0 | 0 | 0 | 0 | 6 |
| Oxyapatite #8 | 60 | 31 | 0 | 0 | 29 | 1 | 1 | 1 | 0 | 0 | 39 | 26 | 0 | 0 | 0 | 0 | 0 | 0 | 13 | 0 |
| Oxyapatite #9 | 65 | 10 | 0 | 0 | 55 | 1 | 1 | 1 | 0 | 0 | 34 | 32 | 0 | 2 | 0 | 0 | 0 | 0 | 0 | 0 |
| Oxyapatite #10 | 65 | 12 | 0 | 0 | 53 | 1 | 1 | 1 | 0 | 0 | 34 | 33 | 0 | 0 | 1 | 0 | 0 | 0 | 0 | 0 |
| Oxyapatite #11 | 64 | 12 | 0 | 0 | 52 | 1 | 1 | 1 | 0 | 0 | 35 | 33 | 0 | 0 | 0 | 2 | 0 | 0 | 0 | 0 |
| Oxyapatite #12 | 63 | 13 | 0 | 0 | 50 | 1 | 1 | 1 | 0 | 0 | 36 | 34 | 0 | 0 | 0 | 0 | 2 | 0 | 0 | 0 |
| Oxyapatite #13 | 65 | 10 | 0 | 0 | 55 | 1 | 1 | 1 | 0 | 0 | 34 | 32 | 0 | 0 | 0 | 0 | 0 | 2 | 0 | 0 |
| Oxyapatite #14 | 65 | 11 | 0 | 0 | 54 | 1 | 1 | 1 | 0 | 0 | 34 | 24 | 10 | 0 | 0 | 0 | 0 | 0 | 0 | 0 |

The amount of water in the slurry obtained after the fine pulverization was adjusted to obtain a slurry for wet molding. This slurry for wet molding was molded in an applied magnetic field of 796 kA/m (10 kOe) using a wet magnetic field molding machine to obtain a molded body having a cylindrical shape having a diameter of 30 mm and a thickness of 15 mm (molding step).

The obtained molded body was dried in atmospheric air at room temperature, and then fired in atmospheric air at 1200° C. (firing (main firing) step).

In this manner, a cylindrical ferrite sintered magnet was obtained.

Examples 12 and 13

The same process as that in Example 1 was performed except that the composition of the M-type ferrite main phase was changed as shown in Table 1.

<Evaluation of Magnetic Characteristics>

After processing the upper and lower surfaces of each ferrite sintered magnet, Br and HcJ at 20° C. were measured using a BH tracer in a maximum applied magnetic field of 29 kOe.

<Composition Analysis>

A thin piece having a thickness of about 100 nm was manufactured from each ferrite sintered magnet through a focused ion beam (FIB) method and observed using a scanning transmission electron microscope (STEM). Using EDX attached to STEM, grains in which the composition of transition metals including Fe in the entire metal and metalloid atoms is less than or equal to 20 at % are determined as second phase grains, and the second phase grains were subjected to EDX point analysis to obtain the composition of the second phases.

In addition, it was confirmed through XRD that ferrite main phases are hexagonal, and the crystal structure and the weight proportion of the second phases were also further analyzed through XRD.

The results of the examples and the comparative examples are shown in Tables 3 to 5.

TABLE 3

| | Second phase XRD results | | | |
|---|---|---|---|---|
| | Oxy-apatite wt % | Ortho-ferrite wt % | Total wt % | Oxyapatite/ ortho-ferrite — |
| Comparative Example 1 | 0 | 1.1 | 1.10 | 0 |
| Example 1 | 4.7 | 0.7 | 5.40 | 6.3 |
| Example 2 | 4.7 | 0.6 | 5.40 | 7.3 |
| Comparative Example 2 | 4.3 | 1.1 | 5.40 | 3.8 |
| Comparative Example 3 | 3.8 | 1.5 | 5.40 | 2.5 |
| Comparative Example 4 | 4.0 | 1.4 | 5.40 | 2.9 |
| Comparative Example 6 | 4.7 | 0.7 | 5.40 | 6.5 |
| Example 3 | 0.0 | 2.9 | 2.90 | 0.0 |
| Comparative Example 7 | 2.9 | 1.1 | 4.00 | 2.7 |
| Comparative Example 8 | 2.3 | 3.7 | 6.00 | 0.6 |
| Example 4 | 2.1 | 1.4 | 3.50 | 1.5 |
| Example 5 | 0.04 | 0.6 | 0.64 | 0.1 |
| Example 6 | 0.08 | 0.5 | 0.58 | 0.2 |
| Example 7 | 0.5 | 0.5 | 1.03 | 1.1 |
| Example 8 | 1.2 | 0.6 | 1.82 | 2.0 |
| Example 9 | 9.7 | 0.5 | 10.17 | 19.3 |
| Example 10 | 11.9 | 0.3 | 12.20 | 39.7 |
| Example 11 | 13.5 | 0.4 | 13.90 | 33.8 |
| Example 12 | 5.0 | 0.8 | 5.78 | 6.2 |
| Example 13 | 4.8 | 0.9 | 5.66 | 5.3 |
| Example 14 | 5.1 | 0.6 | 5.70 | 8.5 |
| Example 15 | 4.9 | 1.1 | 6.00 | 4.5 |
| Example 16 | 4.5 | 0.9 | 5.40 | 5.0 |
| Example 17 | 4.4 | 0.8 | 5.20 | 5.5 |
| Example 18 | 4.2 | 0.9 | 5.10 | 4.7 |
| Example 19 | 4.5 | 1.0 | 5.50 | 4.5 |
| Example 20 | 4.1 | 1.1 | 5.20 | 3.7 |
| Example 21 | 3.6 | 1.2 | 4.80 | 3.0 |

TABLE 4

| | Composition (EDX detection value) of second phase (at %) | | | | | | | | | | | | | | | | | |
|---|---|---|---|---|---|---|---|---|---|---|---|---|---|---|---|---|---|---|
| | A | | | | T | | | | G | | | | | | | | | |
| | A2 | A1 | | | | | | | | | | | | | | | | |
| | Total | La | Ca | Ba | Sr | Total | Fe | Co | Zn | Total | Si | Al | B | F | K | Na | Li | P | S |
| Comparative Example 1 | — | — | — | — | — | — | — | — | — | — | — | — | — | — | — | — | — | — | — |
| Example 1 | 71 | 49 | 19 | 0.2 | 1.8 | 2.4 | 2.1 | 0.1 | 0 | 27 | 27 | 0 | 0 | 0 | 0 | 0 | 0 | 0 | 0 |
| Example 2 | 65 | 48 | 14 | 1.0 | 1.6 | 1.8 | 1.5 | 0.1 | 0 | 33 | 33 | 0 | 0 | 0 | 0 | 0 | 0 | 0 | 0 |
| Comparative Example 2 | 52 | 38 | 11 | 0.8 | 1.3 | 4.9 | 3.9 | 0.8 | 0 | 43 | 43 | 0 | 0 | 0 | 0 | 0 | 0 | 0 | 0 |
| Comparative Example 3 | 53 | 39 | 12 | 0.8 | 1.3 | 7.8 | 3.5 | 3.2 | 0.8 | 39 | 39 | 0 | 0 | 0 | 0 | 0 | 0 | 0 | 0 |
| Comparative Example 4 | 61 | 45 | 13 | 0.9 | 1.5 | 6.6 | 6.5 | 0.1 | 0 | 32 | 32 | 0 | 0 | 0 | 0 | 0 | 0 | 0 | 0 |
| Comparative Example 6 | 83 | 61 | 18 | 1.2 | 2.1 | 2.3 | 2.1 | 0.1 | 0 | 15 | 15 | 0 | 0 | 0 | 0 | 0 | 0 | 0 | 0 |
| Example 3 | 62 | 46 | 14 | 0.9 | 1.6 | 3.9 | 3.8 | 0.1 | 0 | 32 | 32 | 0 | 0 | 0 | 0 | 0 | 0 | 0 | 0 |
| Comparative Example 7 | 63 | 47 | 14 | 0.9 | 1.6 | 14 | 13 | 0.5 | 0 | 28 | 28 | 0 | 0 | 0 | 0 | 0 | 0 | 0 | 0 |
| Comparative Example 8 | 52 | 38 | 11 | 0.8 | 1.3 | 18 | 17 | 0.9 | 0 | 26 | 26 | 0 | 0 | 0 | 0 | 0 | 0 | 0 | 0 |
| Example 4 | 78 | 63 | 13 | 0.5 | 0.4 | 3.6 | 3.5 | 0.1 | 0 | 18 | 18 | 0 | 0 | 0 | 0 | 0 | 0 | 0 | 0 |
| Example 5 | 72 | 52 | 19 | 0.3 | 1.2 | 2.5 | 1.8 | 0.6 | 0 | 24 | 24 | 0 | 0 | 0 | 0 | 0 | 0 | 0 | 0 |
| Example 6 | 70 | 51 | 18 | 0.3 | 1.2 | 2.4 | 2.0 | 0.2 | 0 | 25 | 25 | 0 | 0 | 0 | 0 | 0 | 0 | 0 | 0 |
| Example 7 | 72 | 52 | 18 | 0.5 | 1.3 | 2.3 | 1.7 | 0.6 | 0 | 25 | 25 | 0 | 0 | 0 | 0 | 0 | 0 | 0 | 0 |
| Example 8 | 71 | 51 | 19 | 0.2 | 1.2 | 3.1 | 2.2 | 0.7 | 0 | 24 | 24 | 0 | 0 | 0 | 0 | 0 | 0 | 0 | 0 |
| Example 9 | 71 | 51 | 18 | 0.5 | 1.2 | 3.1 | 2.2 | 0.7 | 0 | 25 | 25 | 0 | 0 | 0 | 0 | 0 | 0 | 0 | 0 |
| Example 10 | 70 | 50 | 18 | 0.6 | 1.1 | 3.3 | 2.4 | 0.8 | 0 | 26 | 26 | 0 | 0 | 0 | 0 | 0 | 0 | 0 | 0 |
| Example 11 | 69 | 49 | 18 | 0.7 | 1.2 | 3.1 | 2.5 | 0.4 | 0 | 24 | 24 | 0 | 0 | 0 | 0 | 0 | 0 | 0 | 0 |
| Example 12 | 72 | 52 | 19 | 0.3 | 1.5 | 3.5 | 2.7 | 0.5 | 0 | 22 | 22 | 0 | 0 | 0 | 0 | 0 | 0 | 0 | 0 |
| Example 13 | 69 | 50 | 18 | 0.8 | 0.6 | 3.1 | 2.2 | 0.7 | 0 | 25 | 25 | 0 | 0 | 0 | 0 | 0 | 0 | 0 | 0 |
| Example 14 | 65 | 33 | 31 | 0.6 | 0.2 | 3.9 | 3.6 | 0.3 | 0 | 31 | 23 | 0 | 0 | 0 | 0 | 0 | 0 | 0 | 8.6 |
| Example 15 | 63 | 30 | 33 | 0.4 | 0.1 | 3.8 | 3.3 | 0.5 | 0 | 33 | 22 | 0 | 0 | 0 | 0 | 0 | 0 | 11 | 0 |
| Example 16 | 65 | 50 | 14 | 0.7 | 0 | 3.2 | 3.1 | 0.1 | 0 | 32 | 31 | 0 | 1.2 | 0 | 0 | 0 | 0 | 0 | 0 |
| Example 17 | 66 | 51 | 14 | 0.9 | 0.3 | 3.7 | 3.3 | 0.4 | 0 | 30 | 29 | 0 | 0 | 1.6 | 0 | 0 | 0 | 0 | 0 |
| Example 18 | 67 | 49 | 17 | 0.3 | 0.4 | 3.3 | 2.9 | 0.4 | 0 | 30 | 28 | 0 | 0 | 0 | 1.3 | 0 | 0 | 0 | 0 |
| Example 19 | 66 | 51 | 14 | 0.5 | 0.4 | 3.8 | 3.7 | 0.1 | 0 | 30 | 29 | 0 | 0 | 0 | 0 | 1.5 | 0 | 0 | 0 |
| Example 20 | 67 | 48 | 18 | 0.6 | 0.1 | 3.5 | 3.3 | 0.2 | 0 | 30 | 27 | 0 | 0 | 0 | 0 | 0 | 2.1 | 0 | 0 |
| Example 21 | 66 | 49 | 16 | 0.5 | 0.2 | 3.5 | 3.1 | 0.4 | 0 | 31 | 21 | 9.1 | 0 | 0 | 0 | 0 | 0 | 0 | 0 |

TABLE 5

| | Magnetic characteristics | | | | |
|---|---|---|---|---|---|
| | Br (mT) | Br Proportion R1 with respect to Comparative Example 1 | HcJ (kA/m) | HcJ Proportion R2 with respect to Comparative Example 1 | R1 + R2 |
| Comparative Example 1 | 460 | — | 289 | — | — |
| Example 1 | 445 | 97% | 365 | 126% | 223% |
| Example 2 | 442 | 96% | 367 | 127% | 223% |
| Comparative Example 2 | 410 | 89% | 317 | 110% | 199% |
| Comparative Example 3 | 422 | 92% | 319 | 110% | 202% |
| Comparative Example 4 | 442 | 96% | 297 | 103% | 199% |
| Comparative Example 6 | 411 | 89% | 329 | 114% | 203% |
| Example 3 | 427 | 93% | 325 | 112% | 205% |
| Comparative Example 7 | 413 | 90% | 306 | 106% | 196% |
| Comparative Example 8 | 444 | 97% | 292 | 101% | 197% |
| Example 4 | 438 | 95% | 331 | 115% | 210% |
| Example 5 | 461 | 100% | 311 | 107% | 208% |
| Example 6 | 460 | 100% | 318 | 110% | 210% |
| Example 7 | 457 | 99% | 340 | 118% | 217% |
| Example 8 | 458 | 99% | 345 | 119% | 219% |
| Example 9 | 436 | 95% | 371 | 128% | 223% |
| Example 10 | 416 | 90% | 378 | 131% | 221% |
| Example 11 | 405 | 88% | 381 | 132% | 220% |
| Example 12 | 446 | 97% | 353 | 122% | 219% |
| Example 13 | 443 | 96% | 355 | 123% | 219% |
| Example 14 | 448 | 97% | 323 | 112% | 209% |
| Example 15 | 450 | 98% | 320 | 111% | 209% |
| Example 16 | 436 | 95% | 354 | 122% | 217% |
| Example 17 | 435 | 95% | 347 | 120% | 215% |
| Example 18 | 441 | 96% | 319 | 110% | 206% |
| Example 19 | 440 | 96% | 317 | 110% | 205% |
| Example 20 | 441 | 96% | 320 | 111% | 207% |
| Example 21 | 428 | 93% | 373 | 129% | 222% |

It was confirmed that both Br and HcJ in the sintered magnets containing second phases having a predetermined composition were larger than that in Comparative Example 1 which did not contain the second phases having a predetermined composition.

REFERENCE SIGNS LIST

4 Hexagonal ferrite main phase
6 Second phase

What is claimed is:

1. A ferrite sintered magnet comprising:
a hexagonal ferrite main phase; and
a second phase,
wherein the second phase is an oxide phase containing
an element A which is at least one selected from the group consisting of Ca, Sr, Ba, Bi, and rare earth elements,
a transition metal element T including at least Fe, and
an element G which is at least one selected from the group consisting of Si, Al, B, F, K, Na, Li, P, and S, and
wherein, when the total number of atoms of the element A, the transition metal element T, and the element G in the second phase is set to 100 at %,
the element A accounts for 30 to 80 at %,
the element G accounts for 15 to 40 at %,
the transition metal element T accounts for less than 4 at %,
La accounts for 10 to 65 at %, and
the atomic proportion of Fe in the second phase is less than or equal to 3 at %.

2. The ferrite sintered magnet according to claim 1, wherein the content of the second phase is 0.05 to 10 mass %.

3. The ferrite sintered magnet according to claim 1, wherein the second phase contains an apatite compound having a $La_{4.67}[SiO_4]_3O$ phase as a prototype.

4. The ferrite sintered magnet according to claim 1, wherein the hexagonal ferrite is a magnetoplumbite-type ferrite.

* * * * *